United States Patent
Hashmi et al.

(10) Patent No.: US 10,326,710 B1
(45) Date of Patent: Jun. 18, 2019

(54) PROPAGATING ACCESS RULES ON VIRTUAL NETWORKS IN PROVIDER NETWORK ENVIRONMENTS

(71) Applicant: Amazon Technologies, Inc., Seattle, WA (US)

(72) Inventors: Omer Hashmi, Chevy Chase, MD (US); Mark Edward Stalzer, Arlington, VA (US)

(73) Assignee: Amazon Technologies, Inc., Seattle, WA (US)

( * ) Notice: Subject to any disclaimer, the term of this patent is extended or adjusted under 35 U.S.C. 154(b) by 404 days.

(21) Appl. No.: 14/843,881

(22) Filed: Sep. 2, 2015

(51) Int. Cl.
*G06F 15/173* (2006.01)
*H04L 12/911* (2013.01)
*G06F 9/455* (2018.01)

(52) U.S. Cl.
CPC ........ *H04L 47/783* (2013.01); *G06F 9/45558* (2013.01); *G06F 2009/45595* (2013.01)

(58) Field of Classification Search
CPC combination set(s) only.
See application file for complete search history.

(56) References Cited

U.S. PATENT DOCUMENTS

| | | |
|---|---|---|
| 8,910,278 B2 | 12/2014 | Davne et al. |
| 2005/0025157 A1 | 2/2005 | Pennec et al. |
| 2006/0184999 A1* | 8/2006 | Guichard ............... H04L 45/00 726/3 |
| 2006/0251088 A1 | 11/2006 | Thubert et al. |
| 2013/0036213 A1 | 2/2013 | Hasan et al. |
| 2013/0094445 A1* | 4/2013 | De Foy ................. H04L 45/021 370/328 |
| 2014/0059226 A1 | 2/2014 | Messerli et al. |
| 2014/0289791 A1* | 9/2014 | Acharya ............. H04L 63/0236 726/1 |
| 2016/0080285 A1 | 3/2016 | Ramachandran et al. |
| 2016/0087940 A1 | 3/2016 | Miller et al. |

FOREIGN PATENT DOCUMENTS

EP   1298853   4/2003

OTHER PUBLICATIONS

NPL, Berger et al. TVDc: Managing Scurity in the Trusted Virtual Datacenter, ACM SIGOPS Publication, Jan. 2008.*

* cited by examiner

Primary Examiner — Padma Mundur
(74) Attorney, Agent, or Firm — Robert C. Kowert; Meyertons, Hood, Kivlin, Kowert & Goetzel, P.C.

(57) ABSTRACT

Methods and apparatus that automatically propagate access rules for access groups within clients' virtual networks on a provider network. A peering protocol may be used to advertise routes from a gateway of a client's external network to a virtual gateway of the client's virtual network via direct and/or virtual connections. The advertised routes may be automatically propagated into the virtual network so that traffic can flow between the source address ranges of the advertised routes and the virtual network. Access group information may be included as metadata with at least some route advertisements. Access rules for access groups on the virtual network may be automatically created or updated according to the metadata included with the advertised routes to allow access from network addresses on the client's external network to the client's resources in the access groups.

21 Claims, 11 Drawing Sheets access rules
300

| <address range(s)> | <target endpoint(s)> | <permission> |
|---|---|---|
| 20.0.0.0/16 | TCP port 80 | Allow |
| 30.0.0.0/16 | TCP port 80 | Allow |
| ⋮ | ⋮ | ⋮ |

FIG. 3 peering protocol
message
400 metadata 410

<access group(s)>      <action> route advertisement(s) 420

<address range(s)>

FIG. 4

PROPAGATING ACCESS RULES ON VIRTUAL NETWORKS IN PROVIDER NETWORK ENVIRONMENTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF THE DRAWINGS

FIG. 3 illustrates example access rules, according to at least some embodiments.

FIG. 4 illustrates an example peering protocol message that includes access group metadata, according to at least some embodiments.

Figure 1:
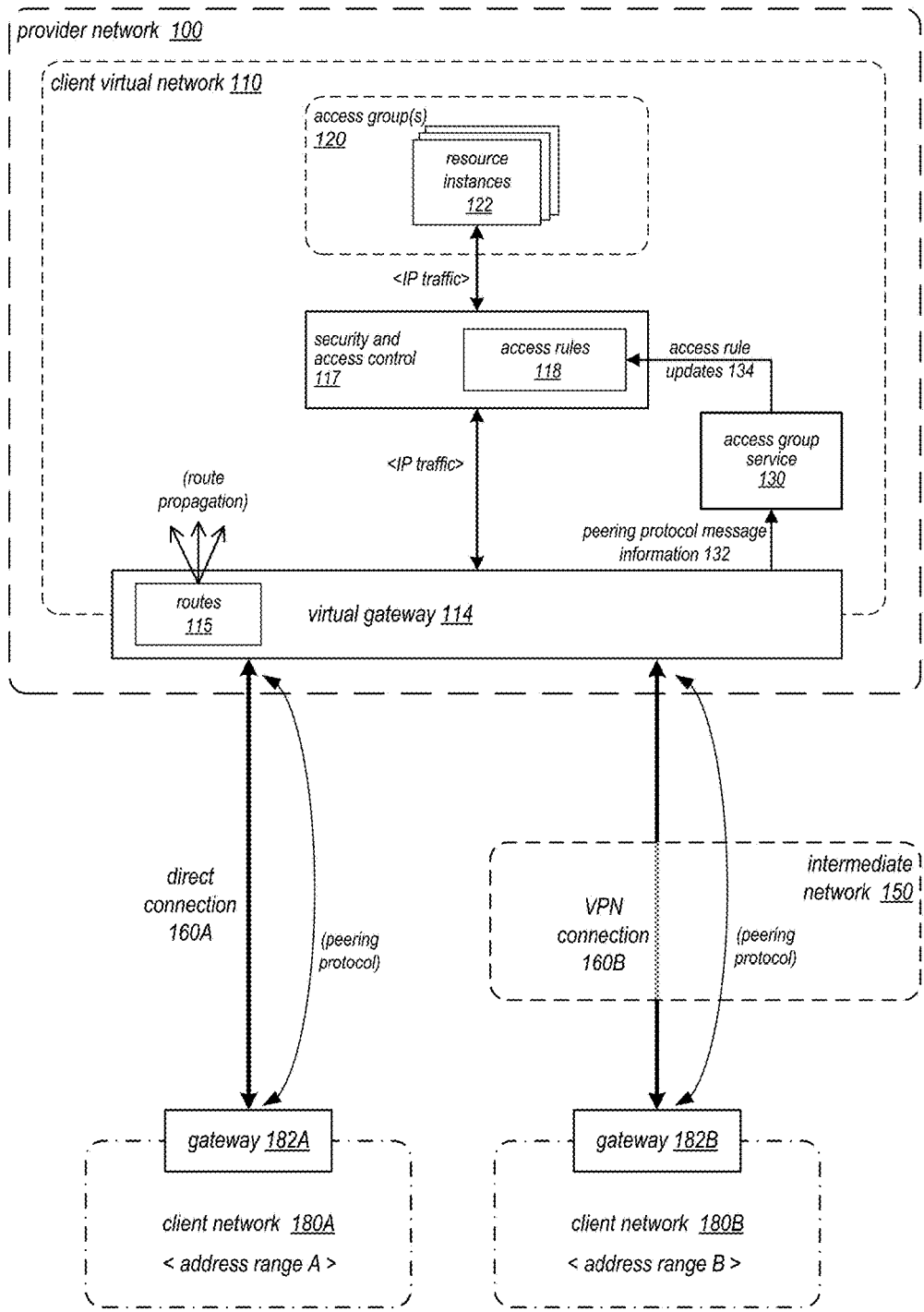
FIG. 1 illustrates connections between a client virtual network and client networks in a provider network environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for propagating access rules on virtual networks in provider network environments are described. Embodiments of methods and apparatus are described that may automatically propagate access rules for access groups within clients' virtual networks on a provider network. Embodiments of the methods and apparatus for propagating access rules on virtual networks in provider network environments may be implemented at least in part as or by one or more services of the provider network. For simplicity, an implementation of the methods and apparatus for propagating access rules on virtual networks may collectively be referred to herein as an access propagation service.

In a provider network environment, the resource instances provisioned in a client's virtual network are in a client-configured private address space. Generally, the client's resource instances can be reached from endpoints external to the virtual network, including the client's endpoints on client network(s) external to the provider network, through an interface to the virtual network provided by the provider network infrastructure. This interface may be referred to as a virtual gateway.

A client of a provider network can establish private communications links or connections between the external client networks and the virtual network via the virtual gateway. The connections may include secure, direct connections via dedicated fiber optic or other cables between the external client networks and the client's virtual network implementation. The connections may also include secure virtual connections between the external client networks and the virtual network over an intermediate network such as the Internet. These secure virtual connections may, for example, be referred to as tunnels or virtual private network (VPN) connections. For example, a virtual connection may be a secure IPsec tunnel established over the Internet according to the Internet Protocol Security (IPsec) protocol suite for secure IP communications.

The direct and/or virtual connections may generally be established between gateways or similar devices of the external client networks and the virtual gateway. The gateways may be configured to communicate over the connections according to a peering protocol (e.g., exterior gateway protocol (EGP), border gateway protocol (BGP), etc.) to exchange routing information for communications between endpoints on the networks.

Figure 11:
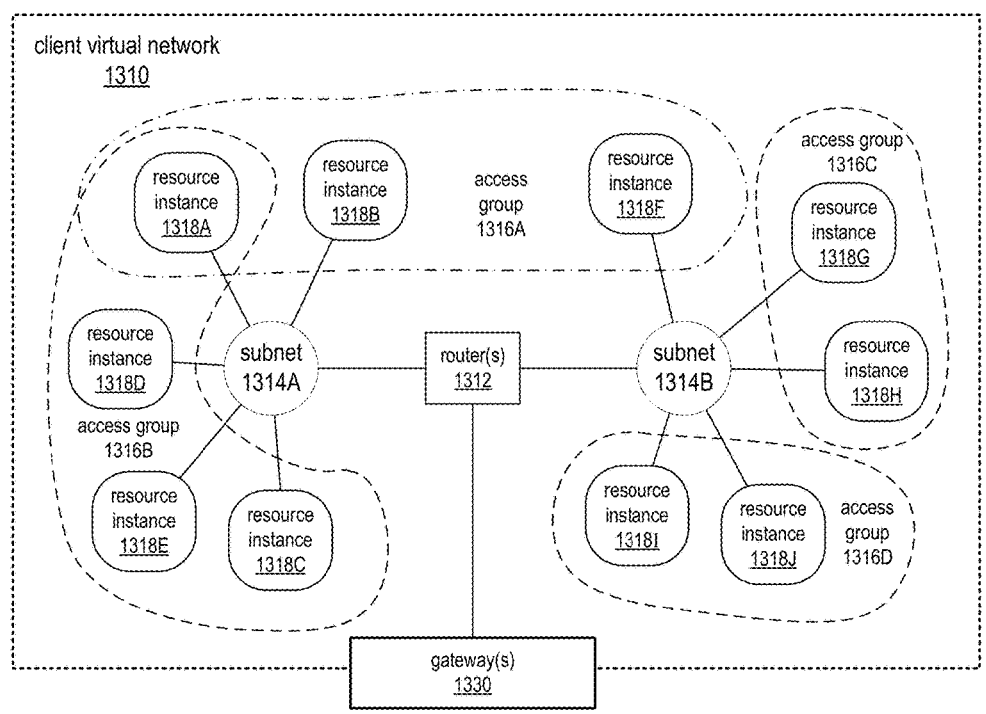
FIG. 11 illustrates subnets and access groups in an example virtual network implementation on a provider network, according to at least some embodiments.

In some embodiments, a provider network may provide one or more services that allow a client to establish virtual access groups within the client's virtual network, for example as illustrated in FIG. 11. In some embodiments, an access group may act as a virtual firewall that controls the traffic allowed to reach one or more resource instances within the access group. Via the provider network services, the client may establish one or more access groups within the virtual network, and may associate the resource instances in the virtual network with one or more of the access groups. In some embodiments, access rules may be established for each access group. The access rules for a given access group may be applied to control the inbound traffic that is allowed to reach the resource instances associated with the access group.

Conventionally, to enable communications from endpoints on an external client network to resource instances on a virtual network via direct and/or virtual connections, the peering protocol is used to advertise routes from a gateway of the external client network to the virtual gateway of the virtual network. In some embodiments, routes received at the virtual gateway are automatically propagated into the virtual network infrastructure so that traffic can flow between the source address ranges of the advertised routes and the virtual network. In a separate operation, the client (e.g., a network administrator) then generates or modifies access rules for one or more access groups of the virtual network to allow access from the source address ranges of the advertised and propagated routes to specified target endpoints in the private address space of the virtual network; the target endpoints correspond to resource instances in respective access groups.

Embodiments of methods and apparatus are described that may automatically create or update access rules for access groups within a client's virtual network on a provider network. In some embodiments, access group information may be included as metadata in at least some peering protocol messages sent from a gateway of an external client network to the virtual gateway of the virtual network. The access rules may be automatically created or updated according to the access group information included as metadata in the peering protocol messages that advertise routes from the client's external client network(s) to the virtual network over direct or virtual secure connections established between the networks' gateways.

In some embodiments, an access group service may be provided on or by the provider network. In some embodiments, the access group service may obtain routing information and access group information from the peering protocol messages, determine access rules for the groups from the information, and automatically propagate the access rules to appropriate components of the virtual network that implement security and access control for the client's resource instances in the virtual network implementation. Via embodiments of the access group service, the access rules for the client's access groups on the virtual network may be automatically updated to allow communications between endpoints on the client's external networks and resource instances in the access groups when new routes are advertised via the peering protocol. Thus, the client does not have to perform a separate operation to generate or modify access rules for one or more access groups of the virtual network to allow source address ranges for the advertised routes access to specified target endpoints in the private address space of the virtual network; the target endpoints correspond to resource instances in the respective access group.

In some embodiments, an access group service may provide an application programming interface (API) via which clients may create, configure, and manage access groups on their virtual network implementations. In some embodiments, the API may allow the client to enable or disable access rule propagation. Enabling access rule propagation may cause the service to automatically propagate access rules to access group(s) on the virtual network in response to new route advertisements received via the virtual gateway. In some embodiments, access rule propagation may be enabled or disabled for the entire virtual network, for particular access groups on the virtual network, for particular virtual gateways, and/or for particular secure connections to a virtual gateway.

As previously noted, in some embodiments, peering protocol messages may include metadata that may be used in access rule propagation. In some embodiments, the source address ranges of advertised routes as specified in peering protocol messages received at the virtual gateway may be automatically propagated to the appropriate access group(s) on the virtual network. In these embodiments, the peering protocol messages do not necessarily include access group information as metadata. In some embodiments, metadata may be included with the advertised routes in the peering protocol messages that indicates whether the respective route(s) are to be automatically added to the access rules for the access groups in the virtual network. In some embodiments, the metadata may indicate an action (e.g., add, don't add, or delete) for an advertised route or source address range. In some embodiments, the metadata may specify other information, such as particular access groups to which the respective route(s) are to be propagated.

Embodiments of the methods and apparatus for propagating access rules on virtual networks in provider network environments may, for example, be implemented in the context of a service provider that provides to clients, via an intermediate network such as the Internet, virtualized resources (e.g., virtualized computing and storage resources) implemented on a provider network of a service provider, and that allow the clients to establish virtual networks within the provider network (referred to herein as virtual networks)

in which the client may launch virtualized resources. FIGS. 7 through 11 and the section titled Example provider network environments further illustrate and describe example service provider network environments in which embodiments of the methods and apparatus as described herein may be implemented.

While embodiments are primarily described as automatically propagating access control rules in a client's virtual network on the provider network for route advertisements received on direct or virtual connections to the client's networks(s) that are external to the provider network, embodiments may also be applied to automatically propagate access control rules in the client's virtual network from connections to other networks, including but not limited to other virtual networks on the provider network and other networks external to the provider network.

FIG. 1 illustrates connections between a client virtual network and client networks in a provider network environment, according to at least some embodiments. FIG. 1 shows as an example a provider network 100 environment in which entities on client network(s) 180 and other external entities may access resources on a provider network 100 over an intermediate network 150 such as the Internet. In FIG. 1, a client corresponding to client network 180 has provisioned resource instances 122 on the provider network 100. The client has also established a virtual network 110 on the provider network 100. A virtual network 110 in a provider network 100 environment may be broadly defined as a network space (e.g., logically defined by an address range) that contains a set of provider network 100 resources of a respective client, and that acts as a logically isolated section on the provider network 100 for the client's resources. For example, in FIG. 1, virtual network 110 contains one or more of the client's resource instances 122 (e.g., virtual machines including guest operating systems) on the provider network 100. In some embodiments, the resource instances 122 are assigned private IP addresses in a client-configured private IP address space of the virtual network. A virtual network 110 may include or implement security and access control for the virtual network 110 and for the resource instances 122 within the virtual network 110. For example, in FIG. 1, virtual network 110 includes a virtual gateway 114 that may control access to resource instances 122 from one or more client networks 180, from other entities on provider network 100 such as other resource instances, and from other entities external to provider network 100. As another example, virtual network 110 may implement route tables, network access control lists (ACLs), and in some embodiments virtual access groups 120 to control access to resource instances 122.

In at least some embodiments of a provider network 100, at least some of the resources provided to clients of a service provider via the provider network 100 may be virtualized computing resources implemented on multi-tenant hardware that is shared with other client(s) and/or on hardware dedicated to the particular client. Each virtualized computing resource may be referred to as a resource instance 122. Resource instances 122 may, for example, be rented or leased to clients of the service provider. For example, clients of the service provider may access one or more services of the provider network via application programming interfaces (APIs) to the services to obtain and configure resource instances 122, including but not limited to computation resources and storage resources. At least some of the resource instances 122 may be implemented according to hardware virtualization technology that enables multiple operating systems to run concurrently on a host computer, i.e. as virtual machines (VMs) on the host. A hypervisor, or virtual machine monitor (VMM), on a host presents the VMs on the host with a virtual platform and monitors the execution of the VMs. Each VM may be provided with one or more provider network private IP addresses; the VMM on a respective host may be aware of the private IP addresses of the VMs on the host. For further information about hardware virtualization technology on a provider network, see FIG. 8.

Referring to FIG. 1, the provider network 100 may include a network substrate that includes networking devices such as routers, switches, network address translators (NATs), and so on, as well as the physical connections among the devices. In at least some embodiments, the VMMs or other devices or processes on the network substrate may use encapsulation protocol technology to encapsulate and route network packets (e.g., client IP packets) over the network substrate between resource instances 122 on different hosts within the provider network 100. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. In at least some embodiments, the encapsulation protocol technology may include a mapping service that maintains a mapping directory that maps IP overlay addresses (public IP addresses) to substrate IP addresses (private IP addresses) and that may be accessed by various processes on the provider network 100 for routing packets between endpoints on the network substrate. For further information about a virtual network technology that uses an encapsulation protocol to implement an overlay network on a network substrate, see FIGS. 7 through 11.

Figure 10:
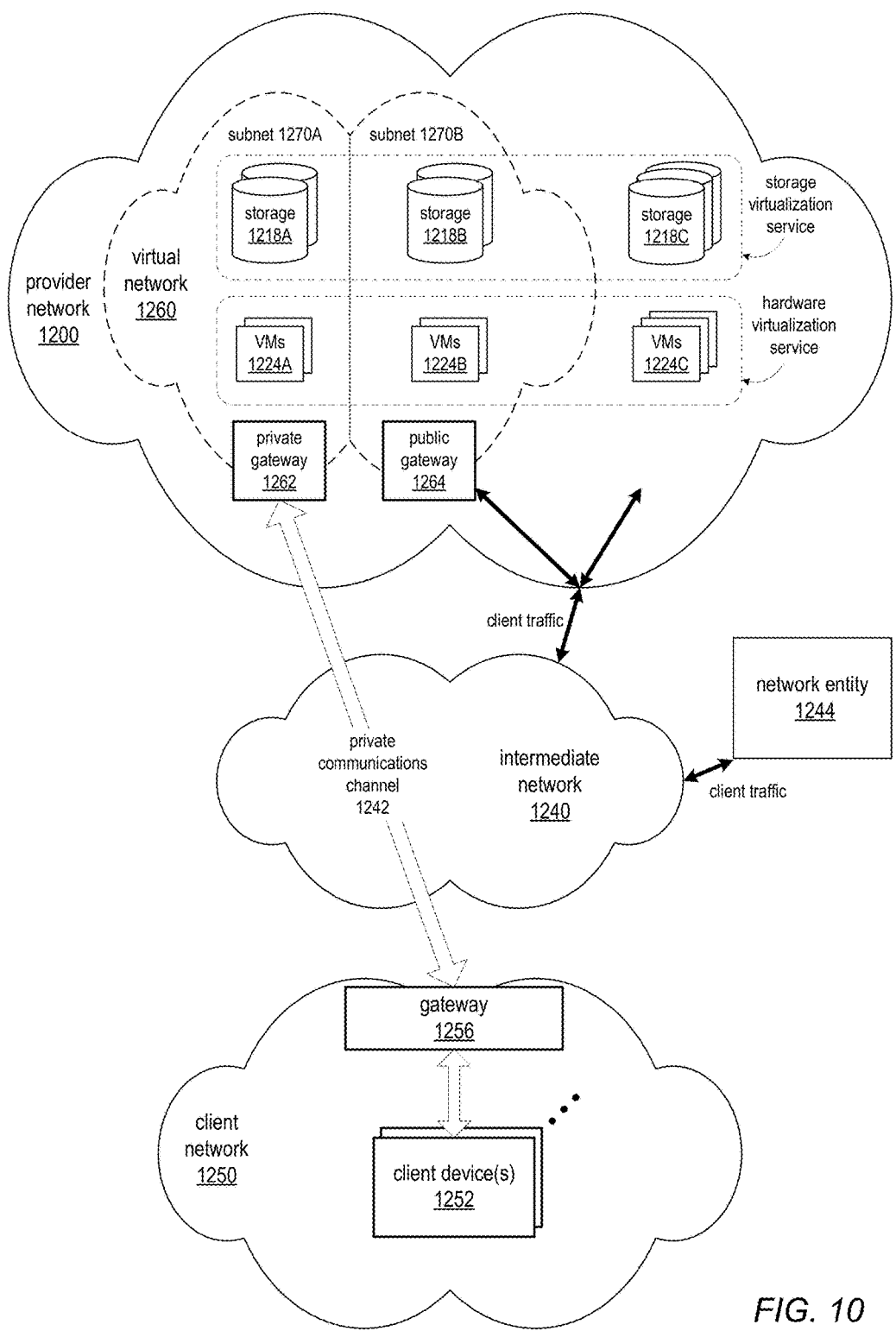
FIG. 10 illustrates an example provider network that provides virtual networks to at least some clients, according to at least some embodiments.

In some embodiments, a service provider may provide services and application programming interfaces (APIs) to the services that, for example, allow clients to provision logically isolated sections of the provider network 100 in which the clients can launch their respective resource instances 122 in a client-defined virtual network 110 on the provider network 100, referred to herein as a client virtual network, or as simply a virtual network. Via the APIs, a client may establish, configure, and manage a client virtual network 110 on provider network 100. The client may also establish and manage security and access control 117 for the virtual networking environment of the client virtual network 110 via the API(s) to the virtual network service(s). The security and access control 117 may, for example, be implemented by or on one or more server devices and/or other devices of the provider network 100. For example, the client may perform one or more of selecting private IP address ranges, creating subnets and network access control lists (ACLs), creating and managing access groups, and configuring route tables, network gateways, load balancers, routers, and other network functionalities to configure the client virtual network 110 and to control access to the client virtual network 110 and its resource instances 122. Via the API(s), a client may customize the network configuration of their client virtual network 110. For example, as illustrated in FIG. 10, a client can create a public-facing subnet for web server resources that has access to the Internet, and may place backend system resources such as databases or application servers in a private-facing subnet with no public Internet access. A client may leverage multiple layers of security and access control, including but not limited to access groups and network ACLs, to control access to subnets and/or to resource instances in each subnet, for example as illustrated in FIG. 11.

In some embodiments, a given client may establish one, two, or more separate virtual networks 110 on a provider network 100, and different clients may each establish one or more virtual networks 110 on a provider network 100. In some embodiments, a client may specify a private IP address space for each of their client virtual networks 110 on the provider network 100. In some embodiments, the private IP address spaces of two (or more) client virtual networks 110 may, but do not necessarily, overlap.

Referring to FIG. 1, in some embodiments, a client of a provider network 100 (e.g., a client associated with client network(s) 180) may provision resource instances 122 within the virtual network 110 using one or more services of the provider network 100, for example as illustrated in FIGS. 10 and 11. In some embodiments, the client may select a private IP address space for the client's virtual network 110; this private IP address space may be any valid private IP address range that the client chooses to use, and may be independent of the provider network 100's address space(s). The provider network 100 may also allow the client to provision a virtual gateway 114 for the virtual network 110 with a public IP address via which entities external to the virtual network 110, including but not limited to devices on the client's external network(s) 180, may access at least some of the client's resource instances 122 on the virtual network 110.

Embodiments of a provider network 100 may provide one or more services and APIs that may allow a client to establish connections 160 between the client's external networks 180 and the client's virtual network 110 on the provider network 100. A connection 160 may provide a communications channel via which the client's resources on client networks 180 may communicate with the client's VN resource instances 122 on the client's virtual network 110 through the virtual gateway 114 using private IP addressing. In some embodiments, a connection 160 may allow the client's resources on client networks 180 to access various implementations of provider network services in or via the client's virtual network 110, including but not limited to database services, load balancer services, data warehousing services, and caching services, through private IP addressing. As illustrated in FIG. 1, the connections 160 may include direct connections 160A via dedicated fiber optic or other cables between a gateway 182A of an external client network 180A and a virtual gateway 114 of the client's virtual network 110 implementation. The connections 160 may also include virtual connections 160B between a gateway 182B of an external client network 180B and a virtual gateway 114 of the client's virtual network 110 implementation over an intermediate network 150 such as the Internet. A virtual connection 160B may, for example, be referred to as tunnels or virtual private network (VPN) connection.

In some embodiments, a client may implement and manage access groups 120 within a virtual network 110, for example as illustrated in FIG. 11. In some embodiments, a virtual network access group 120 may act as a virtual firewall that controls the traffic allowed to reach one or more resource instances 122 within the access group 120. The client may establish one or more access groups 120 within the virtual network 110, and may associate resource instances 122 in the virtual network 110 with one or more of the access groups 120. In some embodiments, the client may establish and/or modify access rules 118 for each access group 120 that control the inbound traffic that is allowed to reach the resource instances 122 associated with the access group 120. FIG. 3 provides a non-limiting example of access rules for an access group in a virtual network, according to some embodiments.

In some embodiments, an access group service 130 may be provided on or by the provider network 100. The access group service 130 may, for example, be implemented by or on one or more server devices and/or other devices of the provider network 100. In some embodiments, the access group service 130 may provide an application programming interface (API) via which clients may create, configure, and manage access groups 120 on their virtual network 110 implementations. In some embodiments, the access group service 130 may allow the client to enable or disable access rule propagation. Enabling access rule propagation may cause the service 130 to automatically propagate access rules 118 to access group(s) 120 on the virtual network 110 in response to route advertisements received via the virtual gateway 114. In some embodiments, access rule propagation may be enabled or disabled for the entire virtual network 110, for particular access groups 120 on the virtual network 110, for particular virtual gateways 114, and/or for particular connections 160 to a virtual gateway 114.

In some embodiments, to enable communications from endpoints on an external client network 180 to resource instances 122 on a virtual network 110 via direct and/or virtual connections 160, a peering protocol (e.g., border gateway protocol (BGP)) is used to advertise routes from a gateway 182 of the external client network 180 to the virtual gateway 114 of the virtual network 110. In some embodiments, routes 115 received at the virtual gateway 114 are automatically propagated into the virtual network 110 infrastructure so that traffic can flow between the source address ranges of the advertised routes 115 and the virtual network 110. Conventionally, in a separate operation, the client (e.g., a network administrator) must then generate or modify access rules 118 for one or more access groups 120 of the virtual network 110 to allow access from the source address ranges of the advertised and propagated routes to specified target endpoints in the private address space of the virtual network 110; the target endpoints correspond to resource instances 122 in respective access groups 120. Conventionally, the access rules 118 for the access groups 120 are static; the client must generate or modify the access rules 118 for an access group 120 to add, delete, or modify the access rules 118.

In embodiments of the methods and apparatus for propagating access rules on virtual networks in provider network environment, instead of requiring the client to perform a separate operation to generate or modify access rules 118 for access groups 120, the access rules 118 for the access groups 120 within a client's virtual network 110 on the provider network may be automatically created or updated 100, for example by an access group service 130, in response to route advertisements from the client's external networks 180 on connections 160. In some embodiments, access group information may be included as metadata in at least some peering protocol messages sent from a gateway 182 of an external client network 180 to the virtual gateway 114 of the virtual network 110, for example as shown in FIG. 4. In some embodiments, the access rules 118 may be automatically created or updated according to the access group information included as metadata in the peering protocol messages that advertise routes from the client's external client network(s) 180 to the virtual network 110 over direct or virtual connections 160 established between the networks' gateways. Thus, the access rules 118 may be dynamically updated in response to route advertisements from the external networks 180; the client does not have to perform a separate operation to generate or modify the access rules 118 to allow source address ranges for the advertised and propagated routes access to resource instances 122 in respective access groups 120 on the client's virtual network 110.

In some embodiments, an access group service 130 may be provided on or by the provider network 100. In some embodiments, the access group service 130 may obtain routing and access group information 132 from peering protocol messages received at a virtual gateway 114 from client network(s) 182 via connection(s) 160, determine access rule updates 134 for one or more access groups 120 from the information 132, and automatically update the access rules 118 for the access groups 120 according to the determined access rule updates 134. Thus, the client does not have to perform separate operations for each advertised and propagated route 115 to generate or modify the access rules 118 for each of one or more access groups 120 to allow connections from client network 180 endpoints corresponding to the source address ranges of the route 115 to specified resource instances 122 in the access group(s) 120.

Figure 2:
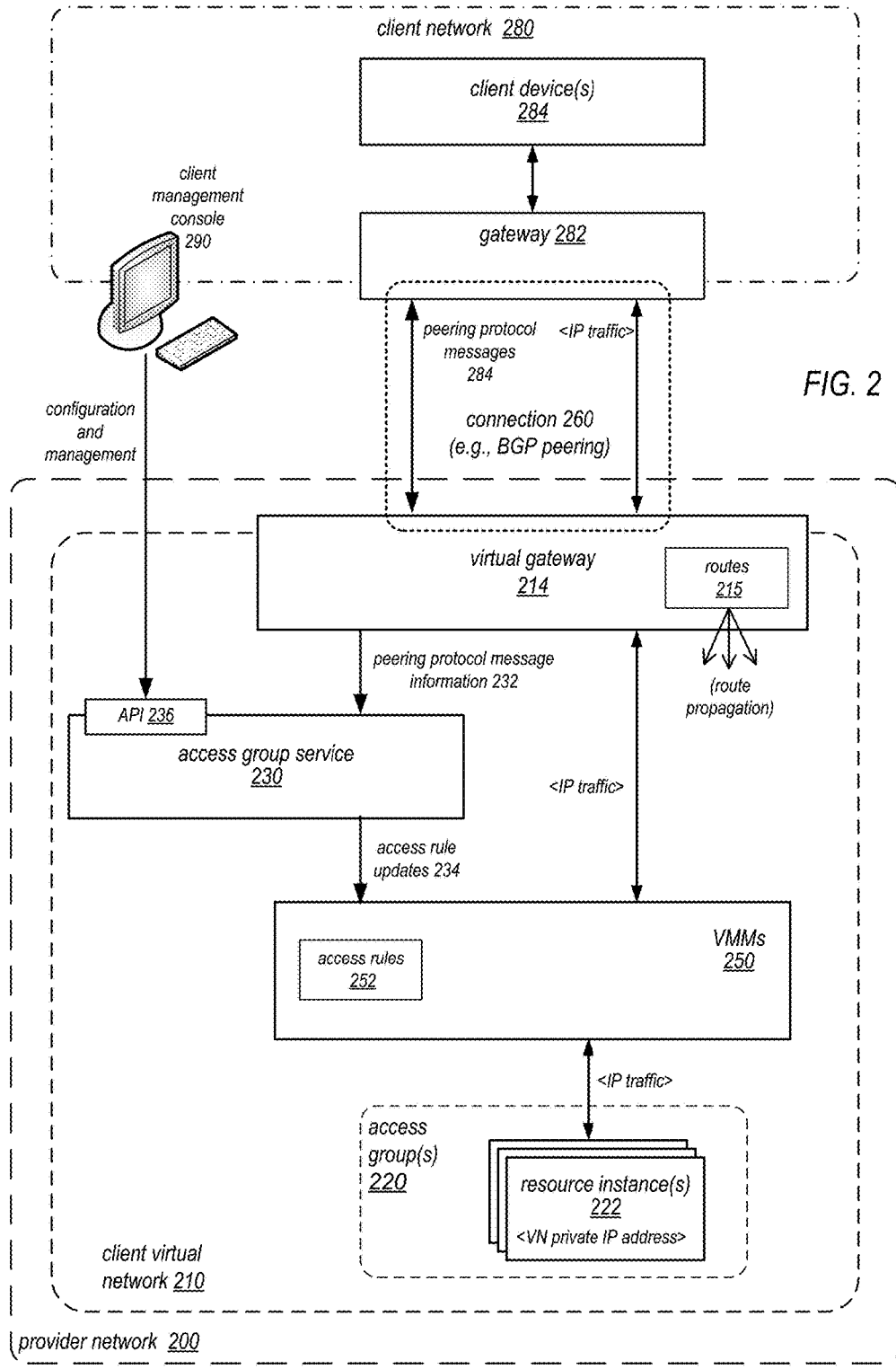
FIG. 2 illustrates propagating access rules for access groups in a provider network environment, according to at least some embodiments.

FIG. 2 illustrates propagating access rules for access groups in a provider network environment, according to at least some embodiments. Embodiments of a provider network 200 may provide one or more services and APIs that may allow a client to establish connections 260 between the client's external network 280 and the client's virtual network 210 on the provider network 200. A connection 260 may be a direct connection or a virtual connection, as illustrated in FIG. 1. A connection 260 may provide a communications channel via which the client's device(s) 284 on client network 280 may communicate with the client's resource instances 222 on the client's virtual network 210 through the virtual gateway 214 using private IP addressing.

To enable communications from devices 284 on client network 280 to resource instances 222 on virtual network 210 via connection 260, a peering protocol (e.g., BGP)) may be used to advertise routes from gateway 282 of client network 280 to the virtual gateway 214 of the virtual network 210. In some embodiments, routes received at the virtual gateway 214 via the route advertisements may be automatically propagated into the virtual network 210 infrastructure so that traffic can flow between the source address ranges of the advertised routes and the virtual network 210.

The provider network 200 may provide one or more services that allow a client to establish virtual access groups 220 within the client's virtual network 210, for example as illustrated in FIG. 11. Access to at least some of the resource instances 222 may be controlled by access rules 252 for the access groups 220. In some embodiments, at least some of the resource instances 222 may be implemented according to hardware virtualization technology that enables multiple operating systems to run concurrently on a host computer, i.e. as virtual machines (VMs) on the host. A hypervisor, or virtual machine monitor (VMM) 250, on a host presents the VMs on the host with a virtual platform and monitors the execution of the VMs. In some embodiments, the VMM 250 on a host machine implements and enforces access rules 252 for the client's resource instances 222 on the respective host machine. FIG. 3 provides a non-limiting example of access rules for resource instances on a virtual network, according to some embodiments.

In some embodiments, an access group service 230 may be provided on or by the provider network 100. The access group service 230 may, for example, be implemented by or on one or more server devices and/or other devices of the provider network 200. In some embodiments, the access group service 230 may provide an application programming interface (API) 236 via which the client may create, configure, and manage access groups 220 on their virtual network 210 implementation, for example using a client management console 290 on client network 280. For example, via the API 236, the client may define an access group 220, and may add resource instances 222 to or remove resource instances 222 from the access group 220. In some embodiments, an access group 220 may act as a virtual firewall that controls the traffic allowed to reach resource instances 220 within the access group 220.

In some embodiments, the API 236 of the access group service 230 may allow the client to enable or disable access rule propagation. Enabling access rule propagation may cause the service 230 to automatically propagate access rules to access group(s) 220 on the virtual network 210 in response to new route advertisements received via the virtual gateway 214. In some embodiments, access rule propagation may be enabled or disabled for the entire virtual network 210, for particular access groups 220 on the virtual network 210, for particular virtual gateways 214, and/or for particular connections 260 to a virtual gateway 214.

Figure 5:
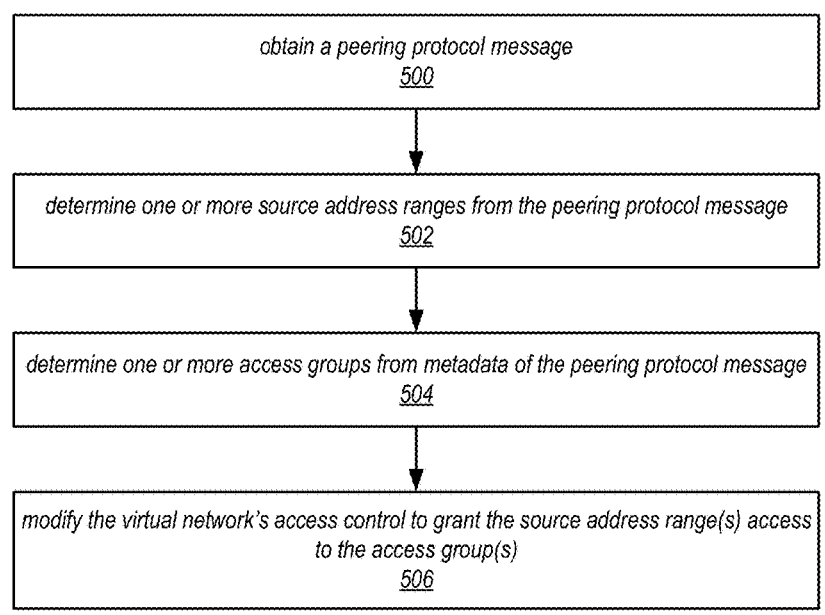
FIG. 5 is a flowchart of a method for propagating access rules for access groups in a provider network environment, according to at least some embodiments.

FIG. 5 is a flowchart of a method for propagating access rules for access groups in a provider network environment, according to at least some embodiments. The method may, for example, be performed by an access group service 230 as illustrated in FIG. 2.

As indicated at 500 of FIG. 5, peering protocol messages may be obtained. In some embodiments, a gateway 282 of client network 280 may send peering protocol messages 284 to the virtual gateway 214 of the virtual network 210 via a connection 260. At least some of the messages 284 may include route advertisements. FIG. 4 illustrates an example peering protocol message that includes route advertisements. In some embodiments, the advertised routes 215 may be automatically propagated into the virtual network 210 infrastructure so that traffic can flow between the source address ranges of the advertised routes and the virtual network 210.

As indicated at 502 of FIG. 5, one or more source address ranges may be determined from an obtained peering protocol message. As indicated at 504 of FIG. 5, one or more access groups may be determined from metadata included in the obtained peering protocol message. In some embodiments, the access group service 230 may obtain information 232 from at least some of the peering protocol messages 284 received at the virtual gateway 214. The information 232 may, for example, include indications of source address ranges for the advertised routes and access group information included as metadata in the messages 234, for example as illustrated in FIG. 4.

As indicated at 506 of FIG. 5, the virtual network's access control may be modified to grant the source address range(s) determined at 502 access to the access group(s) determined at 504. In some embodiments, the access group service 230 may determine one or more access rule updates 234 for one or more access groups 220 from the information 232, and may automatically apply the determined access rule updates 234 to the access groups 220. In some embodiments, VMMs 250 on host machines of the provider network 200 may implement and enforce access rules 252 for the client' resource instances 222 on respective host machines. FIG. 3 provides a non-limiting example of access rules 252 for an access group 220, according to some embodiments. In some embodiments, applying the access rule updates 234 to the access groups 220 involves the access group service 230 automatically updating the access rules 252 on the VMMs 250 according to the determined access rule updates 234.

In some embodiments, when the VMM 250 receives connection requests targeted at the client's resource instances 222 on the respective host machine, the VMM 250 checks its access rules 252 to determine if connections from the requesting address range to the respective target resource instances 222 are allowed. In some embodiments, if the rules 252 do not indicate that the requesting address range has access to the target endpoint, then the VMM 250 denies or ignores the connection request. Once the access rules 252 for an access group 220 on a VMM 250 are automatically updated by the access group service 230 to allow connections from an address range of an advertised and propagated route 215 to endpoints (e.g., resource instances 222) in the access group 220, the VMM 250 allows connections from client device(s) 284 on the client network 280 that are within the address range to the client's resource instances 222 within the access group 220 on the client's virtual network over the connection 260. The update of the access rules 252 is performed automatically by the access group service 230 in response to route advertisements received at the virtual gateway 214, and thus the client does not have to perform a separate operation to add or modify the access rules 242 when advertising new routes to the virtual network 210 from the client's external network 280.

Referring to FIG. 4, in some embodiments, the metadata 410 in a peering protocol message 284 may indicate an action (e.g., add, don't add, or delete) for an advertised route or source address range indicated in the message 284. In some embodiments, the metadata 410 may specify other information, such as particular access groups 220 to which the respective route(s) indicated in route information 420 of the message 284 are to be added, not added, or deleted. In some embodiments, the access group service 230 may perform the indicated action for the respective access group 220. For example, if the action for an access group 220 indicated in the metadata 410 indicates that route(s) indicated in the respective message 284 are to be deleted, then the access group service 230 may remove the address range(s) for the route(s) from the access rules 252 for the access group 220 so that endpoints on the client network 280 in the address range(s) are not allowed to connect to endpoints in the access group 220. In some embodiments, a message 284 may indicate one action for one access group 220, and a different action for another access group 220. For example, a message 284 may indicate that route(s) advertised in the message are to be added to the access rules 252 for one access group 220, and not added to the access rules 252 for another access group 220.

FIG. 3 provides a non-limiting example of access rules for an access group in a virtual network, according to some embodiments. As shown in FIG. 3, access rules 300 for an access group as illustrated in FIGS. 1 and 2 may include a list of one or more rules for controlling access to endpoints on the client's virtual network from external address ranges that have been advertised by the client's external networks via direct or virtual connections as illustrated in FIGS. 1 and 2. Each rule may include an advertised address range from an external network and one or more target endpoints on the virtual network for the respective address range. The address ranges may, for example, be expressed as Classless Inter-Domain Routing (CIDR) prefixes as shown in FIG. 3. For each address range, one or more target endpoint(s) on the virtual network 110 for the respective address range is indicated. The target endpoints may, for example, be expressed as network protocol (e.g., TCP) ports as shown in FIG. 3. In some embodiments, each rule may also include a permission field that may, for example, be set to allow, restrict, or prohibit access to the target endpoint from the source address range.

FIG. 4 provides a non-limiting example of a peering protocol message, according to some embodiments. A peering protocol message 400 may, for example, be used to advertise routes over a connection from a client's external network to the client's virtual network implementation, for example as illustrated in FIGS. 1 and 2. In some embodiments, a peering protocol message 400 may include one or more route advertisements 420. A route advertisement may indicate an address range on the external network and one or more target endpoints on the virtual network for the respective address range. The address ranges may, for example, be expressed as CIDR prefixes. In some embodiments, a peering protocol message 400 may include metadata 410, for example metadata 410 related to route(s) advertised by the message 400. In some embodiments, the metadata 410 may specify one or more access groups to which the advertised route(s) are to be propagated. In some embodiments, for each access group indicated in metadata 410, the metadata 410 may indicate an action (e.g., add, don't add, or delete) for the advertised route(s).

Figure 6:
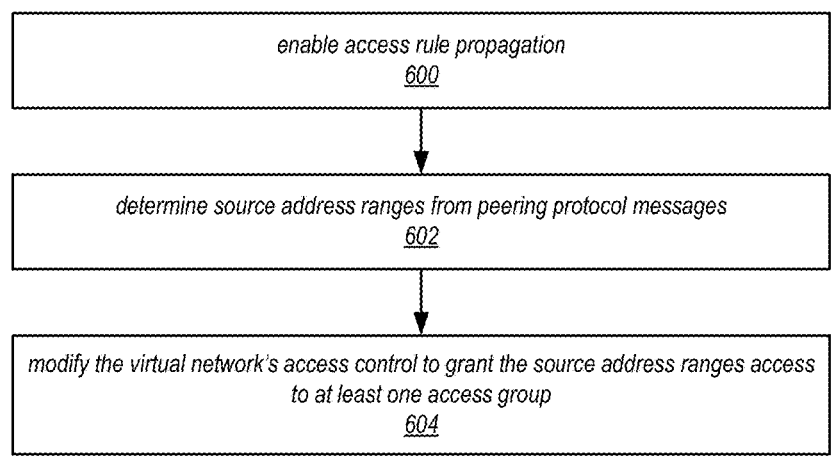
FIG. 6 is a flowchart of an alternative method for propagating access rules for access groups in a provider network environment, according to at least some embodiments.

FIG. 6 is a flowchart of an alternative method for propagating access rules for access groups in a provider network environment, according to at least some embodiments. In some embodiments, instead of or in addition to including access group information as metadata in peering protocol messages, the access group service 230 may automatically update the access rules 252 for at least some access groups 220 in the client's virtual network 210 in response to route advertisements received over the connection 260 to the client network 280. In these embodiments, the peering protocol messages do not necessarily include access group information as metadata.

As indicated at 600 of FIG. 6, access rule propagation may be enabled. In some embodiments, the API 236 to the access group service 230 may allow the client to turn on or off access rule propagation for the access groups 220, for example using a client management console 290 on client network 280. In some embodiments, the API 236 may allow the client to specify particular access groups 220 for which access rule propagation is to be automatically applied. In some embodiments, the API 236 may allow the client to specify particular connections 260 for which access rule propagation is to be automatically applied. As indicated at 602 of FIG. 6, source address ranges may be determined from peering protocol messages received at the virtual gateway 210. In some embodiments, the access group service 230 may obtain information 232 from at least some of the peering protocol messages 234 received at the virtual gateway 214. The information 232 may, for example, include indications of source address ranges for the advertised routes, for example as illustrated in FIG. 4.

As indicated at 604 of FIG. 6, the virtual network's access control may be modified to grant the source address range(s) determined at 602 access to one or more access group(s) on the virtual network. In some embodiments, the access group service 230 may determine one or more access rule updates 234 for one or more access groups 220, and may automatically apply the determined access rule updates 234 to the access groups 220. In some embodiments, VMMs 250 on host machines of the provider network 200 may implement and enforce access rules 252 for the client' resource instances 222 on respective host machines. FIG. 3 provides a non-limiting example of access rules 252 for an access group 220, according to some embodiments. In some embodiments, applying the access rule updates 234 to the access groups 220 involves the access group service 230 automatically updating the access rules 252 on the VMMs 250 according to the determined access rule updates 234.

In some embodiments, when the VMM 250 receives connection requests targeted at the client's resource instances 222 on the respective host machine, the VMM 250 checks its access rules 252 to determine if connections from the requesting address range to the respective target resource instances 222 are allowed. In some embodiments, if the rules 252 do not indicate that the requesting address range has access to the target endpoint, then the VMM 250 denies or ignores the connection request. Once the access rules 252 for an access group 220 on a VMM 250 are automatically updated by the access group service 230 to allow connections from an address range of an advertised and propagated route 215 to endpoints (e.g., resource instances 222) in the access group 220, the VMM 250 allows connections from client device(s) 284 on the client network 280 that are within the address range to the client's resource instances 222 within the access group 220 on the client's virtual network over the connection 260. The update of the access rules 252 is performed automatically by the access group service 230 in response to route advertisements received at the virtual gateway 214, and thus the client does not have to perform a separate operation to add or modify the access rules 242 when advertising new routes to the virtual network 210 from the client's external network 280.

Example Provider Network Environments

This section describes example provider network environments in which embodiments of the methods and apparatus for propagating access rules on virtual networks as described in reference to FIGS. 1 through 6 may be implemented. However, these example provider network environments are not intended to be limiting.

Figure 7:
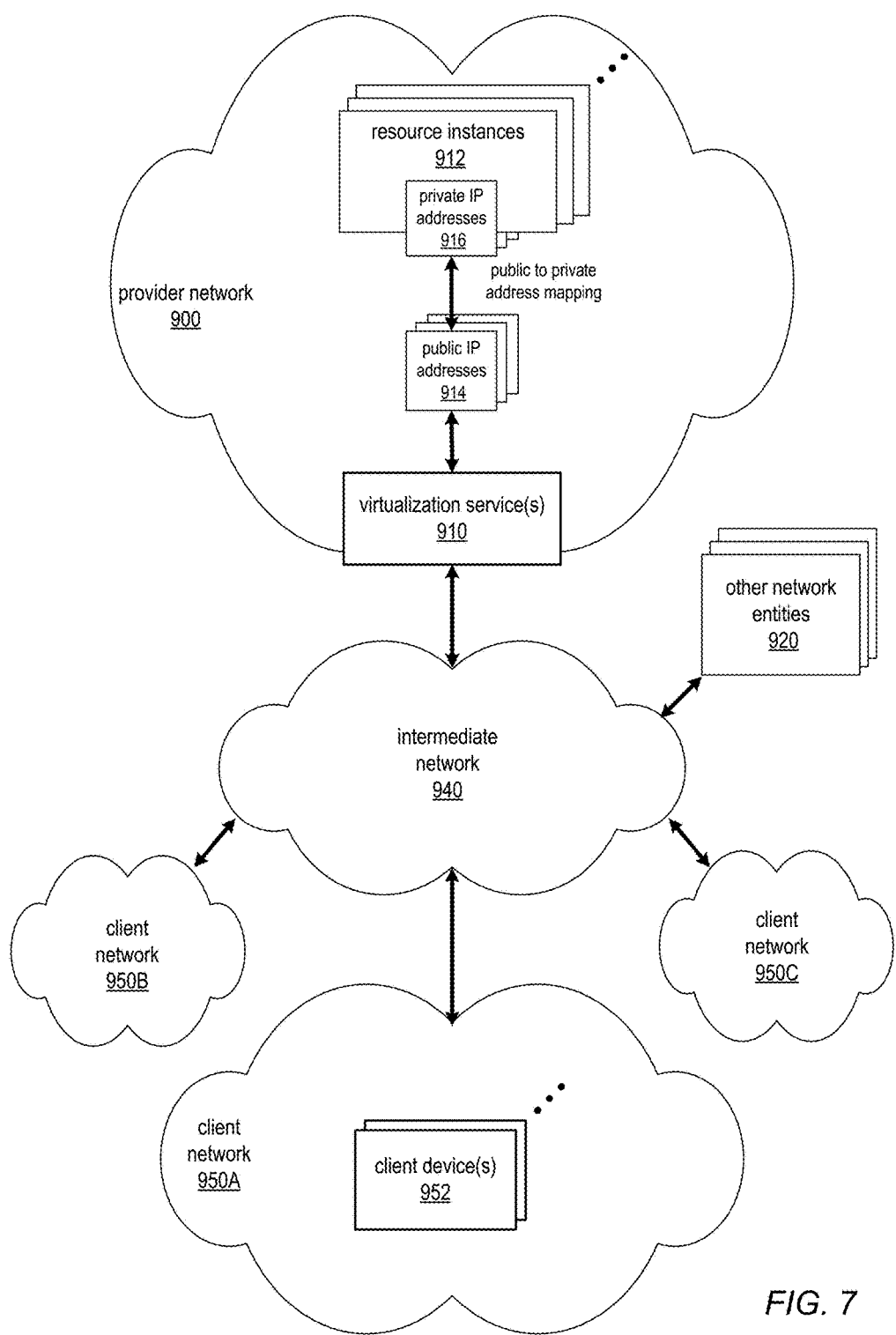
FIG. 7 illustrates an example provider network environment, according to at least some embodiments.

FIG. 7 illustrates an example provider network environment, according to at least some embodiments. A provider network 900 may provide resource virtualization to clients via one or more virtualization services 910 that allow clients to purchase, rent, or otherwise obtain instances 912 of virtualized resources, including but not limited to computation and storage resources, implemented on devices within the provider network or networks in one or more data centers. Private IP addresses 916 may be associated with the resource instances 912; the private IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that clients may obtain from the provider 900.

Conventionally, the provider network 900, via the virtualization services 910, may allow a client of the service provider (e.g., a client that operates client network 950A) to dynamically associate at least some public IP addresses 914 assigned or allocated to the client with particular resource instances 912 assigned to the client. The provider network 900 may also allow the client to remap a public IP address 914, previously mapped to one virtualized computing resource instance 912 allocated to the client, to another virtualized computing resource instance 912 that is also allocated to the client. Using the virtualized computing resource instances 912 and public IP addresses 914 provided by the service provider, a client of the service provider such as the operator of client network 950A may, for example, implement client-specific applications and present the client's applications on an intermediate network 940, such as the Internet. Other network entities 920 on the intermediate network 940 may then generate traffic to a destination public IP address 914 published by the client network 950A; the traffic is routed to the service provider data center, and at the data center is routed, via a network substrate, to the private IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all resource instance types.

At least some public IP addresses may be allocated to or obtained by clients of the provider network 900; a client may then assign their allocated public IP addresses to particular resource instances allocated to the client. These public IP addresses may be referred to as client public IP addresses, or simply client IP addresses. Instead of being assigned by the provider network 900 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 8:
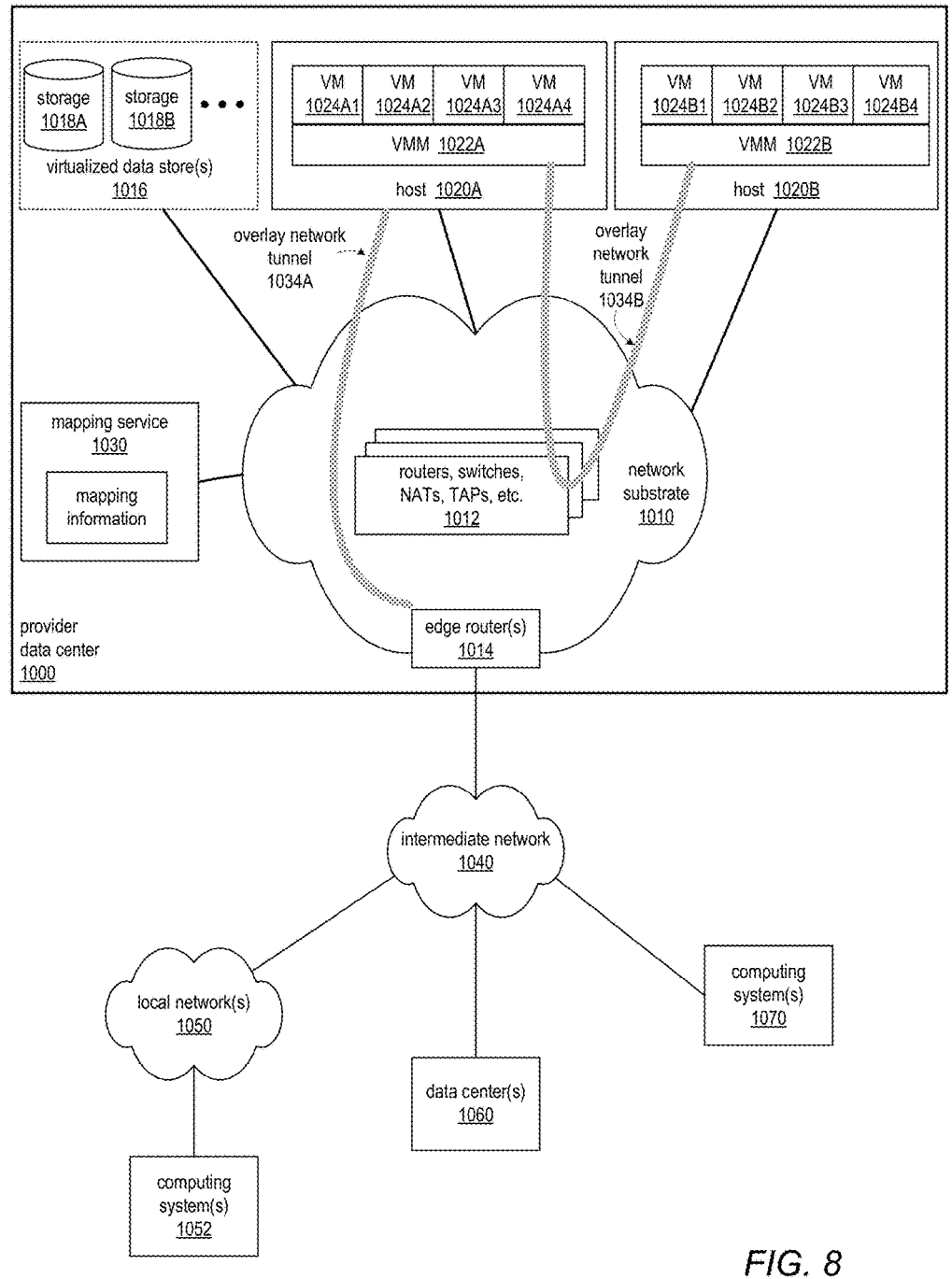
FIG. 8 illustrates an example data center that implements an overlay network on a network substrate using IP tunneling technology, according to some embodiments.

FIG. 8 illustrates an example data center that implements an overlay network on a network substrate using IP tunneling technology, according to at least some embodiments. A provider data center 1000 may include a network substrate that includes networking devices 1012 such as routers, switches, network address translators (NATs), and so on. At least some embodiments may employ an Internet Protocol (IP) tunneling technology to provide an overlay network via which encapsulated packets may be passed through network substrate 1010 using tunnels. The IP tunneling technology may provide a mapping and encapsulating system for creating an overlay network on a network (e.g., a local network in data center 1000 of FIG. 8) and may provide a separate namespace for the overlay layer (the public IP addresses) and the network substrate 1010 layer (the private IP addresses). Packets in the overlay layer may be checked against a mapping directory (e.g., provided by mapping service 1030) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 1030) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 8, an example overlay network tunnel 1034A from a virtual machine (VM) 1024A on host 1020A to a device on the intermediate network 1050 and an example overlay network tunnel 1034B between a VM 1024B on host 1020B and a VM 1024C on host 1020C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 8, at least some networks in which embodiments may be implemented may include hardware virtualization technology that enables multiple operating systems to run concurrently on a host computer (e.g., hosts 1020A and 1020B of FIG. 8), i.e. as virtual machines (VMs) 1024 on the hosts 1020. The VMs 1024 may, for example, be rented or leased to clients of a network provider. A hypervisor, or virtual machine monitor (VMM) 1022, on a host 1020 presents the VMs 1024 on the host with a virtual platform and monitors the execution of the VMs 1024. Each VM 1024 may be provided with one or more private IP addresses; the VMM 1022 on a host 1020 may be aware of the private IP addresses of the VMs 1024 on the host. A mapping service 1030 may be aware of all network IP prefixes and the IP addresses of routers or other devices serving IP addresses on the local network. This includes the IP addresses of the VMMs 1022 serving multiple VMs 1024. The mapping service 1030 may be centralized, for example on a server system, or alternatively may be distributed among two or more server systems or other devices on the network. A network may, for example, use the mapping service technology and IP tunneling technology to, for example, route data packets between VMs 1024 on different hosts 1020 within the data center 1000 network; note that an interior gateway protocol (IGP) may be used to exchange routing information within such a local network.

In addition, a network such as the provider data center 1000 network (which is sometimes referred to as an autonomous system (AS)) may use the mapping service technology, IP tunneling technology, and routing service technology to route packets from the VMs 1024 to Internet destinations, and from Internet sources to the VMs 1024. Note that a protocol such as an exterior gateway protocol (EGP) or border gateway protocol (BGP) is typically used for Internet routing between sources and destinations on the Internet. FIG. 8 shows an example provider fata center 1000 implementing a network that provides resource virtualization technology and that provides full Internet access via edge router(s) 1014 that connect to Internet transit providers, according to at least some embodiments. The provider data center 1000 may, for example, provide clients the ability to implement virtual computing systems (VMs 1024) via a hardware virtualization service and the ability to implement virtualized data stores 1016 on storage resources 1018 via a storage virtualization service.

The data center 1000 network may implement IP tunneling technology, mapping service technology, and a routing service technology to route traffic to and from virtualized resources, for example to route packets from the VMs 1024 on hosts 1020 in data center 1000 to Internet destinations, and from Internet sources to the VMs 1024. Internet sources and destinations may, for example, include computing systems 1070 connected to the intermediate network 1040 and computing systems 1052 connected to local networks 1050 that connect to the intermediate network 1040 (e.g., via edge router(s) 1014 that connect the network 1050 to Internet transit providers). The provider data center 1000 network may also route packets between resources in data center 1000, for example from a VM 1024 on a host 1020 in data center 1000 to other VMs 1024 on the same host or on other hosts 1020 in data center 1000.

A service provider that provides data center 1000 may also provide additional data center(s) 1060 that include hardware virtualization technology similar to data center 1000 and that may also be connected to intermediate network 1040. Packets may be forwarded from data center 1000 to other data centers 1060, for example from a VM 1024 on a host 1020 in data center 1000 to another VM on another host in another, similar data center 1060, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 1018, as virtualized resources to clients of a network provider in a similar manner.

Figure 9:
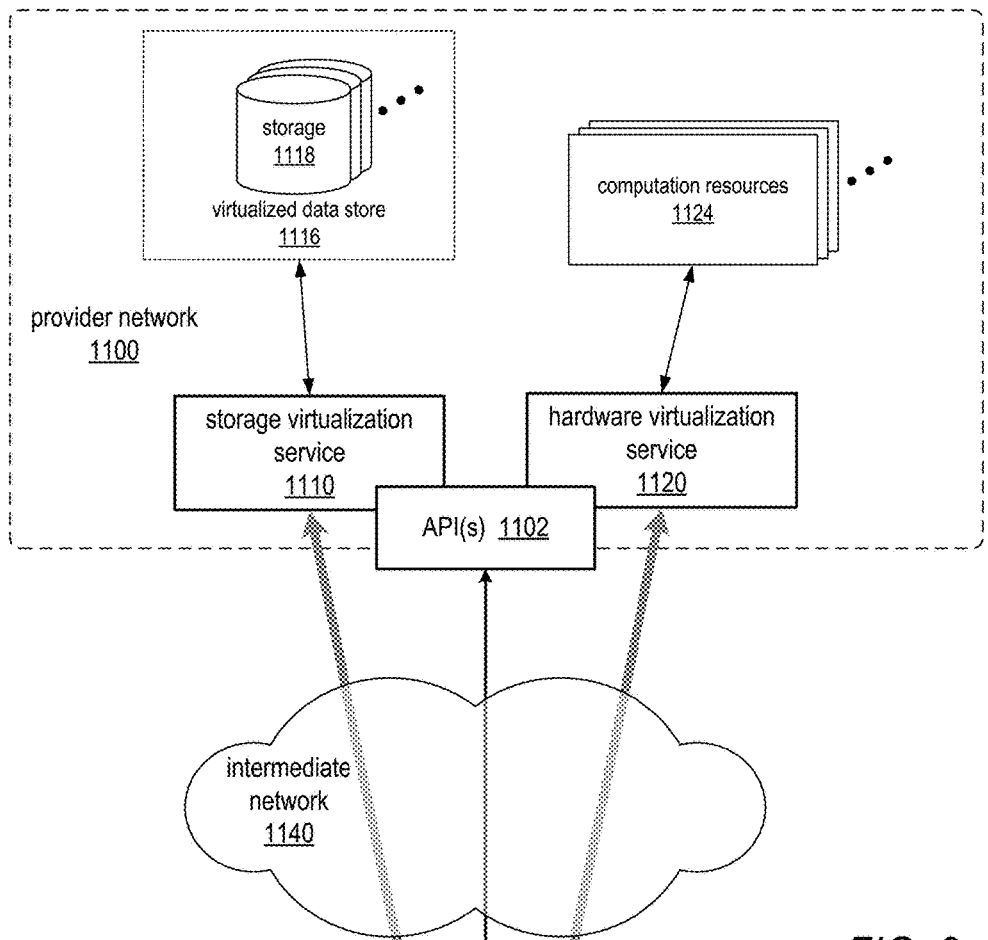
FIG. 9 is a block diagram of an example provider network that provides a storage virtualization service and a hardware virtualization service to clients, according to at least some embodiments.
Figure 9:
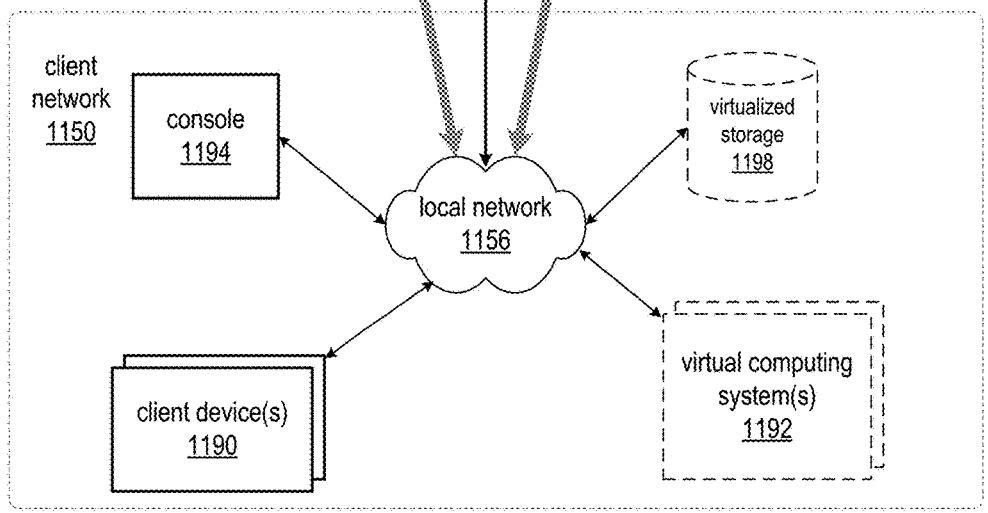

FIG. 9 is a block diagram of an example provider network that provides a storage virtualization service and a hardware virtualization service to clients, according to at least some embodiments. Hardware virtualization service 1120 provides multiple computation resources 1124 (e.g., VMs) to clients. The computation resources 1124 may, for example, be rented or leased to clients of the provider network 1100 (e.g., to a client that implements client network 1150). Each computation resource 1124 may be provided with one or more private IP addresses. Provider network 1100 may be configured to route packets from the private IP addresses of the computation resources 1124 to public Internet destinations, and from public Internet sources to the computation resources 1124.

Provider network 1100 may provide a client network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a client network 1150 may access functionality provided by the hardware virtualization service 1120, for example via a console 1194. In at least some embodiments, at the provider network 1100, each virtual computing system 1192 at client network 1150 may correspond to a computation resource 1124 that is leased, rented, or otherwise provided to client network 1150.

From an instance of a virtual computing system 1192 and/or another client device 1190 or console 1194, the client may access the functionality of storage virtualization service 1110, for example via one or more APIs 1102, to access data from and store data to a virtual data store 1116 provided by the provider network 1100. In some embodiments, a virtualized data store gateway (not shown) may be provided at the client network 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In at least some embodiments, a user, via a virtual computing system 1192 and/or on another client device 1190, may mount and access virtual data store 1116 volumes, which appear to the user as local virtualized storage 1198.

While not shown in FIG. 9, the virtualization service(s) may also be accessed from resource instances within the provider network 1100 via API(s) 1102. For example, a client, appliance service provider, or other entity may access a virtualization service from within a respective virtual network on the provider network 1100 via an API 1102 to request allocation of one or more resource instances within the virtual network or within another virtual network.

FIG. 10 illustrates an example provider network that provides virtual networks on the provider network to at least some clients, according to at least some embodiments. A client's virtual network 1260 on a provider network 1200, for example, enables a client to connect their existing infrastructure (e.g., devices 1252) on client network 1250 to a set of logically isolated resource instances (e.g., VMs 1224A and 1224B and storage 1218A and 1218B), and to extend management capabilities such as security services, firewalls, and intrusion detection systems to include their resource instances.

A client's virtual network 1260 may be connected to a client network 1250 via one or more private communications channels 1242. A private communications channel 1242 may, for example, be a tunnel implemented according to a network tunneling technology or some other technology over an intermediate network 1240. The intermediate network may, for example, be a shared network or a public network such as the Internet. Alternatively, a private communications channel 1242 may be implemented over a direct, dedicated connection between virtual network 1260 and client network 1250.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network.

To establish a virtual network 1260 for a client on provider network 1200, one or more resource instances (e.g., VMs 1224A and 1224B and storage 1218A and 1218B) may be allocated to the virtual network 1260. Note that other resource instances (e.g., storage 1218C and VMs 1224C) may remain available on the provider network 1200 for other client usage. A range of public IP addresses may also be allocated to the virtual network 1260. In addition, one or more networking devices (routers, switches, etc.) of the provider network 1200 may be allocated to the virtual network 1260. A private communications channel 1242 may be established between a private gateway 1262 at virtual network 1260 and a gateway 1256 at client network 1250.

In at least some embodiments, in addition to, or instead of, a private gateway 1262, virtual network 1260 may include a public gateway 1264 that enables resources within virtual network 1260 to communicate directly with entities (e.g., network entity 1244) via intermediate network 1240, and vice versa, instead of or in addition to via private communications channel 1242.

Virtual network 1260 may be, but is not necessarily, subdivided into two or more subnetworks, or subnets, 1270. For example, in implementations that include both a private gateway 1262 and a public gateway 1264, the virtual network may be subdivided into a subnet 1270A that includes resources (VMs 1224A and storage 1218A, in this example) reachable through private gateway 1262, and a subnet 1270B that includes resources (VMs 1224B and storage 1218B, in this example) reachable through public gateway 1264.

The client may assign particular client public IP addresses to particular resource instances in virtual network 1260. A network entity 1244 on intermediate network 1240 may then send traffic to a public IP address published by the client; the traffic is routed, by the provider network 1200, to the associated resource instance. Return traffic from the resource instance is routed, by the provider network 1200, back to the network entity 1244 over intermediate network 1240. Note that routing traffic between a resource instance and a network entity 1244 may require network address translation to translate between the public IP address and the private IP address of the resource instance.

At least some embodiments may allow a client to remap public IP addresses in a client's virtual network 1260 as illustrated in FIG. 10 to devices on the client's external network 1250. When a packet is received (e.g., from network entity 1244), the network 1200 may determine that the destination IP address indicated by the packet has been remapped to an endpoint on external network 1250 and handle routing of the packet to the respective endpoint, either via private communications channel 1242 or via the intermediate network 1240. Response traffic may be routed from the endpoint to the network entity 1244 through the provider network 1200, or alternatively may be directly routed to the network entity 1244 by the client network 1250. From the perspective of the network entity 1244, it appears as if the network entity 1244 is communicating with the public IP address of the client on the provider network 1200. However, the network entity 1244 has actually communicated with the endpoint on client network 1250.

While FIG. 10 shows network entity 1244 on intermediate network 1240 and external to provider network 1200, a network entity may be an entity on provider network 1200. For example, one of the resource instances provided by provider network 1200 may be a network entity that sends traffic to a public IP address published by the client.

FIG. 11 illustrates subnets and access groups in an example virtual network implementation on a provider network, according to at least some embodiments. In at least some embodiments, a provider network such as provider network 1200 in FIG. 10 may allow the client to establish and manage virtual access groups 1316 within the client's virtual network 1310, within or across subnets 1314. An access group 1316 acts as a firewall that controls the traffic allowed to reach one or more resource instances 1318 within the access group 1316. The client may establish one or more access groups 1316 within the virtual network 1310, and may associate each resource instance 1318 in the virtual network 1310 with one or more of the access groups 1316. In at least some embodiments, the client may establish and/or modify rules for each access group 1316 that control the inbound traffic allowed to reach the resource instances 1318 associated with the access group 1316.

In the example virtual network 1310 shown in FIG. 11, the virtual network 1310 is subdivided into two subnets 1314A and 1314B. Access to the virtual network 1310 is controlled by gateway(s) 1330. Each subnet 1314 may include at least one router 1312 that acts to route traffic to (and from) resource instances 1318 on the respective subnet 1314. In some embodiments, network access control lists (ACLs) may be used to control access to the subnets 1314 at router(s) 1312. In the example shown in FIG. 11, resource instances 1318A through 1318E are on subnet 1314A, and resource instances 1318F through 1318J are on subnet 1314B. The client has established four access groups 1316A through 1316D. As shown in FIG. 11, an access group may extend across subnets 1314, as does access group 1316A that includes resource instances 1318A and 1318B on subnet 1314A and resource instance 1318F on subnet 1314B. In addition, a resource instance 1318 may be included in two or more access groups 1316; for example, resource instance 1318A is included in access groups 1316A and 1316B.

Illustrative System

Figure 12:
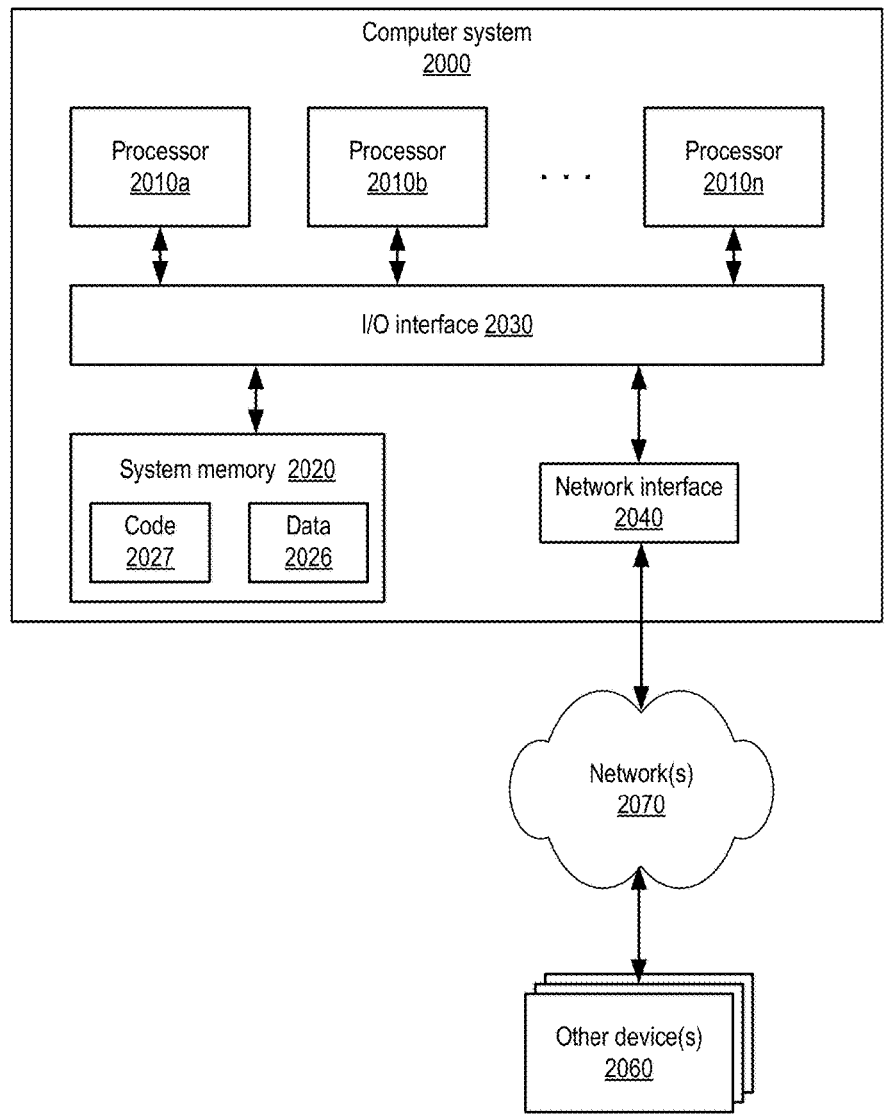
FIG. 12 is a block diagram illustrating an example computer system that may be used in some embodiments.

In at least some embodiments, a server that implements a portion or all of the methods and apparatus for propagating access rules on virtual networks in provider network environments as described herein may include a general-purpose computer system that includes or is configured to access one or more computer-accessible media, such as computer system 2000 illustrated in FIG. 12. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for propagating access rules on virtual networks in provider network environments, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north link and a south link, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 11, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 11 for implementing embodiments of methods for propagating access rules on virtual networks in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a virtual network implemented on a provider network and containing a plurality of virtual network resource instances, wherein the virtual network is configured to control access from external networks to one or more access groups on the virtual network according to access rules, wherein each access group includes one or more of the plurality of resource instances; and
an access group service implemented by one or more devices on the provider network and configured to:
obtain information from a route advertisement received from an external network on a connection from the external network to the virtual network, wherein the information obtained from the route advertisement comprises access group metadata and an address space for which routing is advertised, wherein the address space is external to the virtual network and comprises one or more endpoints, and wherein the access group metadata identifies an access group of the one or more access groups on the virtual network to which the one or more endpoints in the address space are to be allowed access;
determine, based at least in part on the obtained information, the access group to which the one or more endpoints in the address space are to be allowed access; and
add the address space to access rules for the access group to allow the one or more endpoints in the address space access to resource instances in the respective access group.

2. The system as recited in claim 1, wherein the resource instances are virtual machine instances on host devices of the provider network, wherein each host device implements a virtual machine monitor (VMM) that controls access to the virtual machine instances on the respective host device according to access rules on the respective host device, and wherein, to add the address space to access rules for the access group, the access group service is configured to add the address space to the access rules for the access group on at least one host device.

3. The system as recited in claim 1, wherein the route advertisement is received by the virtual network in a peering protocol message on the connection.

4. The system as recited in claim 1, wherein route advertisements are received by the virtual network in peering protocol messages on the connection, and wherein the access group service is configured to automatically add the address spaces of at least some of the advertised routes to the access rules for the one or more access groups of the virtual network to allow endpoints in the address spaces access to resource instances in the one or more access groups.

5. The system as recited in claim 1, wherein the virtual network and the external network are networks of a client of the provider network.

6. The system as recited in claim 1, wherein the connection is a direct connection on a dedicated cable between a gateway device of the external network and a virtual gateway of the virtual network or a virtual connection between the gateway device of the external network and the virtual gateway of the virtual network over an intermediate network.

7. The system as recited in claim 1, wherein the access group service provides an application programming interface (API) via which clients of the provider network can create, configure, and manage access groups on their respective virtual network implementations, wherein the API allows the clients to enable or disable access rule propagation for their respective virtual network implementations, and wherein enabling access rule propagation for a given virtual network configures the access group service to automatically add the address spaces of advertised routes received at the given virtual network to the access rules for the access groups of the given virtual network.

8. A method, comprising:
receiving, at a virtual network implemented on a provider network and containing a plurality of virtual network resource instances, a route advertisement from an external network on a connection from the external network to the virtual network, wherein the virtual network is configured to control access from external networks to one or more access groups on the virtual network according to access rules, wherein each access group includes one or more of the plurality of resource instances;
obtaining, by an access group service implemented by one or more devices on the provider network, information from the route advertisement comprising access group metadata and an address space for which routing is advertised, wherein the address space is external to the virtual network and comprises one or more endpoints, and wherein the access group metadata identifies at least one of the one or more access groups on the virtual network to which the one or more endpoints in the address space are to be allowed access;

determining, by the access group service based at least in part on the obtained information, at least one access group to which the one or more endpoints in the address space are to be allowed access; and adding, by the access group service, the address space to respective access rules for the at least one access group to allow the one or more endpoints in the address space access to resource instances in the respective access groups.

9. The method as recited in claim 8, wherein the resource instances are virtual machine instances on host devices of the provider network, wherein each host device implements a virtual machine monitor (VMM) that controls access to the virtual machine instances on the respective host device according to access rules on the respective host device.

10. The method as recited in claim 9, wherein adding the address space to respective access rules for at least one access group comprises adding the address space to the access rules on at least one host device.

11. The method as recited in claim 8, further comprising: receiving, by the virtual network, the route advertisement in a peering protocol message on the connection.

12. The method as recited in claim 8, wherein route advertisements are received by the virtual network in peering protocol messages on the connection, and wherein the method further comprises automatically adding, by the access group service, the address spaces of at least one of the advertised routes to the access rules for the at least one access group.

13. The method as recited in claim 8, wherein the virtual network and the external network are networks of a client of the provider network.

14. The method as recited in claim 8, wherein the connection is a direct connection on a dedicated cable between a gateway device of the external network and a virtual gateway of the virtual network.

15. The method as recited in claim 8, wherein the connection is a virtual connection between the gateway device of the external network and the virtual gateway of the virtual network over an intermediate network.

16. The method as recited in claim 8, wherein the access group service provides an application programming interface (API) via which clients of the provider network can create, configure, and manage access groups on their respective virtual network implementations.

17. The method as recited in claim 16, further comprising:
receiving, according to the API, a request from a client to enable access rule propagation for one or more specified access groups of their respective virtual network implementation; and
in response to the request, configuring the access group service to automatically add the address spaces of advertised routes received at the virtual network to the access rules for the specified access groups.

18. The method as recited in claim 8, wherein the virtual network resource instances include virtualized resources provisioned in the virtual network according to one or more hardware virtualization services.

19. A non-transitory computer-readable storage medium storing program instructions that when executed on one or more computers cause the one or more computers to implement an access rule service configured to:
obtain information from a route advertisement received from an external network on a connection from the external network to a virtual network implemented on a provider network, the virtual network containing a plurality of virtual network resource instances, wherein:
the virtual network is configured to control access from external networks to one or more access groups on the virtual network according to access rules, wherein each access group includes one or more of the plurality of resource instances;
the information obtained from the route advertisement comprises access group metadata and an address space for which routing is advertised;
the address space is external to the virtual network and comprises one or more endpoints; and
the access group metadata identifies an access group of the one or more access groups on the virtual network to which the one or more endpoints in the address space are to be allowed access;
determine, based at least in part on the obtained information, the access group to which the one or more endpoints in the address space are to be allowed access; and
add the address space to access rules for the determined access group to allow the one or more endpoints in the address space access to resource instances in the respective access group.

20. The non-transitory computer-accessible storage medium as recited in claim 19, wherein the route advertisement is received in a peering protocol message on the connection, wherein the peering protocol message includes metadata indicating the access group to which the endpoints in the address space of the advertised route are to be allowed access, and wherein the access group service is configured to determine the access group to which endpoints in the address space of the advertised route are to be allowed access according to the metadata in the peering protocol message.

21. The non-transitory computer-accessible storage medium as recited in claim 19, wherein the access group service provides an application programming interface (API) to clients of the provider network, wherein the access group service is configured to:
receive, according to the API, a request from a client to enable access rule propagation for one or more specified access groups of their respective virtual network implementation; and
in response to the request, configure the access group service to automatically add the address spaces of advertised routes received at the virtual network to the access rules for the specified access groups.

* * * * *